United States Patent [19]

Kainer et al.

[11] Patent Number: 4,895,821
[45] Date of Patent: Jan. 23, 1990

[54] PROCESS FOR THE MANUFACTURE OF CATALYTIC ELEMENTS AND CATALYTIC ELEMENTS SO PRODUCED

[75] Inventors: Hartmut Kainer, Wiesbaden; Eugen Bühler, Königstein; Daniel Grimm, Bad Schwalbach; Wilfried Schenelle, Wiesbaden; Claus Flockenhaus, Essen; Karl-Heinrich Laue, Hattingen; Klaus Merkel, Essen, all of Fed. Rep. of Germany

[73] Assignees: Didier-Werke AG, Wiesbaden; Didier Engineering GmbH, Essen, both of Fed. Rep. of Germany

[21] Appl. No.: 231,716

[22] Filed: Aug. 12, 1988

[30] Foreign Application Priority Data

Aug. 14, 1987 [DE] Fed. Rep. of Germany ....... 3727119

[51] Int. Cl.$^4$ .................. B01J 23/34; B01J 23/74; B01J 23/86
[52] U.S. Cl. .................................. 502/204; 502/207; 502/210; 502/213; 502/217; 502/221; 502/222
[58] Field of Search ............... 502/210, 213, 217, 221, 502/222, 204, 207

[56] References Cited

U.S. PATENT DOCUMENTS 4,695,559  9/1987  Wegener et al. .................... 502/183
4,742,036  5/1988  Flockenhaus et al. ............. 502/213

FOREIGN PATENT DOCUMENTS 3526383  12/1986  Fed. Rep. of Germany .
3505648   2/1987  Fed. Rep. of Germany .
3531651   2/1987  Fed. Rep. of Germany ...... 502/213

Primary Examiner—W. J. Shine
Attorney, Agent, or Firm—Nils H. Ljungman

[57] ABSTRACT

This invention relates to a process for the manufacture of catalysts for the reduction of nitrogen oxides in exhaust gases or for chemical air cleaning processes, in which catalyst moldings are produced from iron oxide or mixtures of iron oxide and chromium oxide and/or manganese oxide, which are reduced to grain sizes less than 2 mm, with the use of inorganic binders and sulfuric acid, and with the possible addition of activating additives.

In accordance with the invention:
  (a) either the mixture of the solid primary material is reacted with sulfuric acid, a mixture of sulfuric acid and phosphoric acid or a sulfuric acid or mixture of sulfuric acid and phosphoric acid containing sulfate, hydrogen sulfate, phosphate or hydrogen phosphate of ammonium, aluminum, iron, vanadium, manganese, molybdenum, chromium, copper and/or cobalt, and moldings are formed from this mixture, or the mixture of the solid primary material is formed into moldings after the addition of fluid and/or phosphoric acid and/or phosphates, and these moldings are treated with sulfuric acid or a sulfuric acid containing sulfate or hydrogen sulfate of ammonium, aluminum, iron, vanadium, manganese, molybdenum, chromium, copper, and
  (b) then, on the moldings obtained in Step (a), a drying treatment is performed at 110° C. to 250° C., followed by a tempering treatment at 250° C. to 600° C.

The catalysts manufactured using the process described by the invention have a low sensitivity to moisture and good activity.

24 Claims, No Drawings

PROCESS FOR THE MANUFACTURE OF CATALYTIC ELEMENTS AND CATALYTIC ELEMENTS SO PRODUCED

BACKGROUND OF THE INVENTION

1. Field of the Invention

This invention relates to a process for the manufacture of catalysts for the reduction of nitrogen oxides in exhaust gases or for chemical air cleaning processes, in which process catalyst moldings are manufactured from iron oxide or mixtures of iron oxide and chromium oxide and/or manganese oxide, possibly with the addition of measured quantities of activating additives, using sulfuric acid and phosphoric acid, and to catalysts manufactured according to the process.

2. Description of the Prior Art

The prior art includes processes for the manufacture of catalysts for the reduction of nitrogen oxides in exhaust gases or for chemical air cleaning processes, whereby in the reduction of nitrogen oxides from exhaust gases, $NH_3$ is added to these exhaust gases for the chemical reaction of the nitrogen oxides with the ammonia, to form nitrogen.

U.S. Pat. No. 4,742,036 issued May 3, 1988 and entitled "Catalyst Plate" describes catalysts for the reduction of nitrogen oxides in exhaust gases, which contain as the principal ingredient a granular $Fe_2O_3$ catalyst material and a binder, whereby this binder is phosphoric acid in a first mixture with the $Fe_2O_3$ and sulfuric acid in a second mixture with $Fe_2O_3$. These two mixtures are mixed with one another, and catalyst plates are manufactured from the resulting mixture.

U.S. Pat. No. 4,695,559, issued Sept. 22, 1987 and entitled "Catalyst for the Selective Reduction of Nitrogen Oxides in Waste Gases and Process for the Manufacture and Use of Such a Catalyst" describes a process for the manufacture of similar catalysts, in which iron oxide and chromium oxide as well as activating additives are mixed dry. This dry mixture is bonded with phosphoric acid, and then saturated with sulfuric acid. A calcining or tempering treatment is conducted and the moldings are then manufactured.

3. Cross-Reference to Copending Applications

U.S. patent application Ser. No. 94,081, filed Sept. 4, 1987 now U.S. Pat. No. 4,806,427, and entitled "Process for the Production of Catalysts for the Reduction of Nitrogen Oxides from Exhaust Gas and Similar Chemical Air Cleaning Processes" describes a process for the production of catalysts for the reduction of nitrogen oxides in exhaust gases, in which a catalytically active oxide mixture of iron or chromium ore and liquefier is prepared with water and sulfuric acid into a slicker, which is then applied to a metal carrier previously treated with an etching acid.

U.S. patent application Ser. No. 938,518, filed Dec. 5, 1986, now U.S. Pat. No. 4,758,545, and entitled "Process for the Manufacture of Catalysts Moldings from Granular Catalyst Material Such as Iron Ore or Chromium Ore with the Use of a Binder" also describes a process for the manufacture of catalyst moldings of iron, chromium or similar ores, using a binder, whereby the granular primary ores are first subjected to a thermal pretreatment at temperatures from approximately 250° C. to 1000° C., before they are mixed with dilute and/or concentrated sulfuric acid as a binder and reprocessed into catalyst moldings.

U.S. patent application Ser. No. 231,702 entitled "Process for the Manufacture of Catalytic Elements and Catalytic Elements so Produced" was filed on Aug. 12, 1988, which corresponds to German Patent Application No. P 37 27 118.0 filed on Aug. 14, 1987 which is entitled in English translation "Process for the Manufacture of Catalysts for the Reduction of Nitrogen Oxides in Exhaust Gases or for Chemical Air Cleaning Processes, and Catalysts Manufactured According to the Process".

All of the above-mentioned U.S. patents and applications are hereby expressly incorporated by reference as if the contents thereof were set forth in full herein.

OBJECTS OF THE INVENTION

A principal object of the present invention is the provision of a process for the manufacture of catalysts of the type described above, in which catalysts are obtained which have an exceptionally high resistance to moisture and good activity. The problem of moisture resistance in catalysts for the removal of nitrogen oxides from exhaust gases is well known, since when such catalysts are used, the temperature in the exhaust gas can drop below the dew point, thereby causing moisture to be deposited on the catalyst molding. This moisture can either cause disintegration or excessive deformation of the catalyst molding.

SUMMARY OF THE INVENTION

Surprisingly, it has now been found that in the manufacture of such catalysts for the reduction of nitrogen oxides in exhaust gases and for chemical air purification processes, which are generally manufactured from iron oxide or mixtures of iron oxide and chromium oxide and/or manganese oxide, with the addition of activating additives known to the prior art, it is possible to achieve an excellent resistance to moisture, i.e. wet strength, and a good activity, if sulfuric acid and phosphoric are added, not as in the prior art before the pressing of the moldings, but only after the manufacture of the catalyst moldings.

The process according to the invention, in a first embodiment, is characterized by the fact that the moldings are manufactured from the oxides, using inorganic and/or organic binders. The moldings are dried and/or hardened, the moldings obtained are treated with a mixture of sulfuric acid and phosphoric acid, and then the saturated moldings are subjected to a temperature treatment between 100° C. and 600° C.

In a second embodiment, the process is characterized by the fact that the moldings are manufactured from the oxides, using inorganic and/or organic binders. The moldings are dried and/or hardened, the moldings obtained are either first treated with sulfuric acid and then with phosphoric acid, or first with phosphoric acid and then with sulfuric acid, and then the saturated moldings are subjected to a temperature treatment between 100° C. and 600° C.

In another preferred embodiment of the process according to the invention, the sulfuric acid is replaced either in whole or in part by a water soluble or acid soluble sulfate and/or hydrogen sulfate of ammonium or the metals iron, vanadium, nickel, molybdenum, aluminum, manganese, cobalt, copper or chromium, or the phosphoric acid is replaced in whole or in part by a water soluble phosphate and/or hydrogen phosphate of ammonium or the metals iron, nickel, molybdenum, aluminum, manganese or chromium. In this embodiment, therefore any desired combination can be used, which contains at least one of the above-mentioned acids sulfuric acid or phosphoric acid, whereby the other components then consist of the water soluble or acid soluble sulfate and/or hydrogen sulfate and/or phosphate and/or hydrogen phosphate.

In the process according to the invention, the acids or salts are used in the form of the above-mentioned sulfate, hydrogen sulfate, phosphate or hydrogen phosphate in quantities such that the ratio of sulfate to phosphate is in the range of 1000:1 to 1:1000, and preferably in the range from 10:1 to 1:10, whereby this ratio is the ratio by weight.

In another preferred embodiment of the invention, the subsequent temperature treatment for the process according to the invention is conducted first as a drying treatment between 100° C. and 250° C., and after the drying as a tempering treatment up to a maximum temperature in the range of 250° C. to 600° C., preferably at a maximum temperature of 350° C. to 450° C.

In another preferred embodiment, the temperature in this tempering treatment up to the maximum temperature, i.e. from the maximum drying temperature up to the maximum temperature, is increased at a rate between 5° C./h and 200° C./h.

Preferably, the maximum temperature of the tempering treatment is maintained for 2 to 24 hours, and the moldings are then allowed to cool to the ambient temperature.

In the process according to the invention, the principal components of the catalyst are iron oxide or mixtures or iron oxide and chromium oxide and/or manganese oxide. The phrase "iron oxide and chromium oxide and/or manganese oxide" as used here also includes iron ores or chromium ores or manganese ores with high concentrations of $Fe_2O_3$ or $Fe_3O_4$ and $Cr_2O_3$ and manganese oxides. Therefore, the pure oxides need not be used. The oxides or ores are customarily used in a suitably small form, e.g. grain sizes of less than 1–2 mm. In the process according to the invention, activating additives are advantageously added in measured quantities to the iron oxide or the mixture of iron oxide and chromium oxide and/or manganese oxide.

These additives can be substances of the prior art, which are added either in the form of the element, the oxide or other suitable salts. Examples of such additive elements are vanadium, copper, cobalt, uranium, tungsten, nickel, molybdenum, manganese, tin, zinc, beryllium, boron, yttrium, niobium, antimony, zirconium, bismuth, silver and rare earth elements in the form of oxides or hydroxides. In catalysts according to the invention, oxides or hydroxides of magnesium, aluminum and silicon can also be present as impurities in the primary materials, or they can be intentionally added.

In the process according to the invention, inorganic and/or organic binders can also be used for the manufacture of the catalyst moldings. Examples of such inorganic binders are alumina, in particular binder alumina, kaolins, aluminaceous compounds such as aluminum hydroxide and aluminum hydroxychloride, compounds containing magnesium or calcium, such as cements, e.g. sorel cements, calcium aluminate or calcium silicate cements, possibly with fine-grain $SiO_2$, or combinations of these compounds.

The organic binders used in the process according to the invention can be those which are themselves part of the prior art in the field of refractories. Examples of such organic binders are cellulose ether, phenol resins, e.g. phenol novolaks, which is a powder resin, with the use of appropriate hardeners, e.g. hexamethylenetetramine, as well as modified furan resins, e.g. furfuryl alcohol resins, which are also used with an appropriate hardener, e.g. hexamethylenetetramine. In addition to the inorganic and/or organic binders, other additives can also be added to the primary mixture for the manufacture of catalyst moldings which can also exert a binding action, or which react with the acids during subsequent treatment and form sulfate or phosphate, which significantly increase the strength of the catalysts ultimately obtained. Examples of such additives are: olivine, talcum, metal hydroxides or carbonates or hydrogen carbonates, e.g. of Mg, Al, Fe, Ca and particulate $SiO_2$.

The process steps for the manufacture of a catalyst according to the invention are themselves part of the prior art. In this process, the primary materials, together with any additives which may be required and the binder, and a possible small amount of a fluid, either water or an organic solvent, such as an alcohol, are mixed into a homogeneous mixture in a suitable mixer. The desired moldings are molded from the mixture, either in a press, isostatically molded, extruded or rolled.

These green moldings are then either only dried for an accelerated hardening of the bond, e.g. if only inorganic binders are used. Or if a hardening is to be conducted when organic binders are used, they are exposed to a sufficient temperature for the required length of time. Drying when inorganic binders are used is customarily done in the range between 100° C. and 150° C., while when only organic binders are used, or when organic and inorganic binders are used together, the temperature is generally in the range between 150° C. and 250° C.

After the drying or hardening of the moldings, the moldings are subjected to the treatment with sulfuric acid and phosphoric acid, either a mixture of these two acids, or first a treatment with sulfuric acid and then a treatment with phosphoric acid, or first a treatment with phosphoric acid and then a treatment with sulfuric acid. This treatment can be a dip treatment, i.e. the moldings are immersed in the acid mixture or in the individual acids one after the other, or the acid mixture or the individual acids can be sprayed or brushed onto the moldings. If the moldings are dipped, the immersion tie is in general between 3 and 100 seconds, which is a function of the dimensions of the molding, in particular the wall thickness.

Then the moldings treated with the acids or the corresponding salts are dried, generally between 1 and 4 hours at a temperature between 110° C. and 250° C. After completion of the drying, i.e. the elimination of gaseous and volatile components, the molding is subjected to a tempering treatment, for which an advantageous temperature increase rate is from 10° C./h to 200° C./h. The moldings are generally held for a certain time, between 2 and 24 hours, at the maximum temperature of the tempering treatment.

Then the moldings are allowed to cool, after which they are ready for use. Preferably the tempering is conducted in an atmosphere with a reduced oxygen content, e.g. 0.5–10% oxygen, preferably 2–4% oxygen.

In general, the invention features a process for the manufacture of catalytic elements, the process comprising the steps of:

(a) providing a primary catalytic material, the primary catalytic material being a member chosen from the group consisting essentially of iron oxide, a mixture of iron oxide and chromium oxide, a mixture of iron oxide and manganese oxide, and a mixture of iron oxide, chromium oxide and manganese oxide and combinations of members of the group;

(b) mixing a binder substance with the primary catalytic material for binding the primary catalytic material;

(c) molding the mixed primary catalytic material and binder substance produced in step (b) to produce green catalytic elements;

(d) subjecting the green catalytic elements to a first temperature treatment to set the binder substance;

(e) treating the catalytic elements obtained from step (d) with sulfuric acid and phosphoric acid; and (f) subjecting the catalytic elements obtained from step (e) to a second temperature treatment in the range between about 100° C. and about 600° C. to temper the catalytic elements.

DESCRIPTION OF THE PREFERRED EMBODIMENTS

The invention is explained in greater detail by means of the following examples.

EXAMPLE 1

1.95 kg of iron ore comprising 95% $Fe_2O_3$ (remainder $SiO_2$, $Fe_2O_3$ and $Al_2O_3$), the iron ore having a raw density of 3.6 g/cm$^3$, a total porosity of more than 15 vol. % and a grain size of 0.09–1.0 mm, and 0.6 kg of the same iron ore with a grain size of 0–0.09 mm and 0.3 kg of chromium ore with a content of 50% $Cr_2O_3$ (remainder MgO, $SiO_2$, $Fe_2O_3$ and $Al_2O_3$) were homogeneously mixed in a turbulence mixer with 0.15 kg of binder alumina. During mixing, 80 ml of 65% sulfuric acid was sprayed and homogeneously mixed in. From this compound, moldings having the dimensions of 150×150×2.4 mm were pressed under a pressure of 40 N/mm$^3$. These moldings were then dried for 2 hours at 200° C. and heated to 450° C. at a heating rate of 50° C./h. They were held for 5 hours at 450° C. and then allowed to cool.

EXAMPLE 2

The process of Example 1 was repeated. However, initially the iron ore with a grain size between 0–0.09 mm, the binder alumina and 0.125 kg of vanadium pentoxide were intensively mixed in a vibrating ball mill. This premixture was then combined with the other solid substances in the turbulence mixer. The sulfuric acid was added and the moldings were produced as in Example 1.

EXAMPLE 3

0.75 kg of the iron ore used in Example 1 with a grain size of 0.09–0.2 mm, 2.1 kg of the same iron ore with a grain size from 0–0.09 mm, 0.09 kg of binder alumina and 0.12 kg of talcum were combined with 0.15 kg of vanadium pentoxide and 0.09 kg of a cellulose ether, which served as an organic binder and plastifier, in a kneader with 40 ml of 70% phosphoric and 80 ml of 65% sulfuric acid, along with 350 ml of water, and mixed to form a plastic compound. This compound was then rolled into sheets of 150×150×2.4 mm, and moldings with a web-shaped cross section and having the dimensions of 50×50×500 mm were formed by extrusion. These moldings were dried for 24 hours in air and then dried for 24 hours at 110° C. They were then heated to 450° C. at a rate of 20° C./h, held at 450° C. for 5 hours, and then cooled.

EXAMPLES 4 TO 17

The primary mixtures of solids described in Examples 1 to 3 were used, and the acid or acid-sulfate-phosphate mixtures described in Table I were added:

TABLE I

| Example | Initial Solids Mixture | | |
|---|---|---|---|
| 4 | 1 | Mixture of | 25% sulfuric acid (95%) 25% phosphoric acid (70%) 50% water |
| 5 | 2 | Mixture of | 25% sulfuric acid (95%) 25% monoaluminum phosphate (50%) 50% water |
| 6 | 3 | Mixture of | 25% sulfuric acid (95%) 5% phosphoric acid (70%) 20% monochromate phosphate solution 50% water |
| 7 | 1 | Mixture of | 50% sulfuric acid (95%) 50% water + 2.0% ammonium hydrogen phosphate |
| 8 | 2 | Mixture of | 25% sulfuric acid (95) 25% phosphoric acid (70%) 50% water + 1.0% aluminum hydroxide |
| 9 | 3 | Mixture of Example 4 + 4.0% iron (II) sulfate heptahydrate | | |
| 10 | 1 | Mixture of Example 4 + 4.0% iron (III) sulfate | | |
| 11 | 1 | Mixture of Example 4 + 5.0% vanadium (IV) oxysulfate pentahydrate | | |
| 12 | 1 | Mixture of Example 4 + 0.1% nickel oxide | | |
| 13 | 1 | Mixture of Example 4 + 0.1% molybdenum (VI) oxide | | |
| 14 | 2 | Mixture of Example 4 + 4.0% aluminum sulfate hydrate | | |
| 15 | 1 | Mixture of Example 4 + 0.5% manganese (II) sulfate monohydrate | | |
| 16 | 1 | Mixture of Example 4 + 1.0% iron powder | | |
| 17 | | Initial mixture of solid substances Mixture of 70% phosphoric acid (85%) 30% water + 4.0% iron (II) sulfate heptahydrate + 4.0% aluminum sulfate hydrate | | |

EXAMPLE 18

1.95 kg of iron ore with 95% $Fe_2O_3$ (remainder $SiO_2$, FeO and $Al_2O_3$), having a raw density of 3.6 g/cm$^3$ and a total porosity of more than 15 vol. % with a grain size of 0.09–1.0 mm, 0.6 kg of the same iron ore with a grain size of 0–0.09 mm and 0.3 kg of chromium ore with a concentration of 50% $Cr_2O_3$ (remainder MgO, $Fe_2O_3$, $SiO_2$, $Al_2O_3$) were homogeneously mixed in a turbulence mixer with 0.15 kg of binder alumina and 0.06 kg of aluminum hydroxide. Then, 0.3 kg of a modifying furan resin in furfuryl alcohol and 18 g of hexamethylenetetramine were added and homogeneously mixed in. From this mixture, moldings with the dimensions of 150×150×2.4 mm were pressed under a pressure of 40 N/mm$^3$. To dry and harden the bond, the moldings were heated to a temperature of 180° C. for 0.5 h.

EXAMPLE 19

1.95 kg of the iron ore used in Example 18, with a grain size of 0.09–1.0 mm, 0.9 kg of the same iron ore with a grain size of 0–0.09 mm, 0.15 kg of the binder alumina used in Example 18, 0.06 kg of pulverized olivine and 0.06 kg of a pulverized phenol novolak with 9% hexamethylenetetramine were thoroughly mixed in a mixer. Then, 80 ml of water was worked in. Moldings with the dimensions indicated in Example 18 were produced by pressing under the same conditions. These moldings were then dried and hardened under the same conditions indicated in Example 18.

EXAMPLE 20

1.95 kg of the iron ore indicated in Example 18 with a grain size of 0.09–1.0 mm, 0.9 kg of the same iron ore with a grain size of 0–0.09 mm, 0.15 kg of the binder alumina used in Example 18, 0.03 kg of an $SiO_2$-sol and 0.06 kg of a pulverized phenol novolak with 9% hexamethylenetetramine were thoroughly mixed in a mixer. Then, 80 ml of a 10% monoaluminum phosphate solution was worked in. Moldings with the dimensions indicated in Example 18 were produced by pressing under the same conditions. These moldings were then dried and hardened under the same conditions indicated in Example 18.

EXAMPLE 21

The operations described in Example 18 were repeated. However, the iron ore with a grain size of 0–0.09 mm had been previously intensively mixed with 0.15 kg of vanadium pentoxide in a vibrating ball mill. This iron ore treated with vanadium pentoxide was then used in the manufacture of the catalyst moldings as described above.

EXAMPLE 22

The operations described in Example 18 were repeated. However, the iron ore with a grain size of 0–0.09 mm had been previously intensively mixed with 0.15 kg of niobium oxide in a vibrating ball mill. This iron ore treated with niobium oxide was then used in the manufacture of the catalyst moldings as described above.

EXAMPLE 23

1.95 kg of the iron ore used in Example 18 with a grain size of 0.09–1.0 mm, 0.9 kg of the same iron ore with a grain size of 0–0.09 mm, 0.15 kg of binder alumina and 0.03 kg of MgO were homogeneously mixed in a mixer. Then, 80 ml of water was added to the mixer. From this mixture, using the process described in Example 18, moldings were produced, which were dried at 120° C. These dried moldings were then immersed for 10 seconds in a 30% solution of aluminum hydroxide chloride and then dried again at 120° C.

Example 24

2.1 kg of the iron ore used in Example 18 with a grain size of 0–0.09 mm, 0.75 kg of the same iron ore with a grain size of 0.09–0.2 mm, 0.03 kg of binder alulmina and 0.12 kg of talcum, as well as 0.09 kg of a cellulose ether used as an organic binder and plastifier, with 0.015 kg of a pulverized phenol novolak with approximately 9% hexamethylenetetramine and 450 ml of water were homogeneously mixed in a kneading mixer to form a plastic compound. The compound was rolled out into sheets having the dimensions of 150×150×2.4 mm, and moldings with the dimensions of 50×50×500 mm with a web-shaped cross section were produced by extrusion. The moldings were dried in air for 24 hours, and then held for 24 hours at 110° C. to remove the water, and for 0.5 hours at 180° C., to harden the organic binder.

EXAMPLE 25

1.5 kg of the iron ore used in Example 18 with a grain size of 0–0.09 mm, 0.75 kg of the same iron ore with a grain size of 0.09–0.2 mm, 0.6 kg of the chromium ore used in Example 18 with a grain size of 0–0.09 mm, 0.03 kg of binder alumina, 0.12 kg of talcum, 0.15 kg of vanadium pentoxide, 0.06 kg of aluminum hydroxide, 0.09 kg of a cellulose ether and 0.15 kg of a modified furan resin with furfuryl alcohol and 9 g of hexamethylenetetramine, along with 400 ml of water, were homogeneously mixed in a kneading mixer to form a plastic compound. The compound was processed and the moldings were dried as in Example 24.

EXAMPLE 26

1.2 kg of the iron ore used in Example 18 with a grain size of 0–0.09 mm, 0.75 kg of the same iron ore with a grain size of 0.09–0.2 mm, 0.9 manganese ore with 30% $MnO_2$, the remainder being $Fe_2O_3$, $Al_2O_3$, $SiO_2$ and CaO, and having a total porosity of more than 30 vol. %, with a grain size of 0–0.09 mm, 0.03 kg of binder alumina, 0.12 kg of talcum, 0.09 kg of a cellulose ether, 0.015 kg of a pulverized phenol novolak with approximately 9% hexamethylenetetramine and 450 ml of water were homogeneously mixed in a kneading mixer to form a plastic compound. The compound was processed and the moldings were dried as in Example 24.

EXAMPLE 27

The catalyst molding manufactured in Example 18 was immersed in an acid bath having the below-identified composition for 15 seconds. Then, the molding was dried for 2 hours at 200° C. and then heated at a temperature increase rate of 10° C./h to 450° C. for the tempering treatment. After a hold time of 5 hours, the molding was cooled to the ambient temperature, and produced a moisture-resistant catalyst with good activity. The tempering treatment was conducted in an atmosphere with 5 vol. % oxygen.

Mixture of
 25% sulfuric acid (95%)
 25% phosphoric acid (70%)
 50% water

EXAMPLES 28 TO 35

The operations described in Example 27 were repeated. The acids described in Example 27 were used, but with the additives listed in Table II:

TABLE II

| Example | |
|---|---|
| 28 | Acid from Ex. 27 + 4.0% iron (II) sulfate heptahydrate. |
| 29 | Acid from Ex. 27 + 4.0% iron (III) sulfate. |
| 30 | Acid from Ex. 27 + 5.0% vanadium (IV) oxysulfate pentahydrate. |
| 31 | Acid from Ex. 27 + 0.1% nickel oxide. |
| 32 | Acid from Ex. 27 + 0.1% molybdenum (VI) oxide. |
| 33 | Acid from Ex. 27 + 4.0% aluminum sulfate hydrate. |
| 34 | Acid from Ex. 27 + 0.5% manganese (II) sulfate monohydrate. |
| 35 | Acid from Ex. 27 + 1.0% iron powder. |

EXAMPLE 36

The catalyst molding produced in Example 19 was saturated with the following mixture:

Mixture of
- 25% sulfuric acid (95%)
- 25% monoaluminum phosphate (50%)
- 50% water The drying and tempering treatment was done as in Example 27.

EXAMPLE 37

The catalyst molding produced in Example 21 was sprayed with the following mixture, until drops of the mixture ran off its surface:
Mixture of
- 25% sulfuric acid (95%)
- 5% phosphoric acid (70%)
- 20% monochromium phosphate solution
- 50% water The drying and tempering treatment was done as in Example 27.

EXAMPLE 38

The catalyst moldings produced in Example 22 were first saturated in a solution of 50% sulfuric acid, then removed from the sulfuric acid solution, allowed to drip dry, and after 10 minutes were immersed in a 4% aqueous solution of ammonium hydrogen phosphate They were removed, allowed to drip dry and then dried at 180° C. for 2 hours, and then subjected to the tempering treatment described in Example 27.

EXAMPLE 39

The catalyst molding produced in Example 23 was treated with the following acid solution by immersion:
Mixture of
- 25% sulfuric acid (95%)
- 5% phosphoric acid (70%)
- 49% water
- +1% aluminum hydroxide.

The drying and tempering treatment was done as in Example 27.

EXAMPLE 40

The molding produced in Example 24 was saturated with the following solution, and treated as described in Example 27.
Mixture of
- 70% phosphoric (85%)
- 30% water
- +4.0% iron (II) sulfate heptahydrate
- +4.0% aluminum sulfate hydrate The catalysts manufactured in the examples have a good resistance to moisture and good activity for the reduction of nitrogen oxides in exhaust gases, with the addition of ammonia.

The moisture resistance of the finished catalyst moldings can be determined by placing the catalyst moldings in a container with water. A moisture resistant molding will retain its shape for at least 24 hours and will retain its strength essentially completely. A molding not resistant to moisture disintegrates in the water in less than 24 hours.

The numbers indicating percents in the parentheses in the examples are preferably concentration percents of the components written therebefore.

In summing up, one aspect of the invention resides broadly in a process for the manufacture of a catalyst for the reduction of nitrogen oxide from waste gases or for chemical air cleaning processes, in which catalyst moldings are manufactured from iron oxide or from mixtures of iron oxide and chromium oxide and/or manganese oxide, possibly with the addition of measured quantities of activating additives, using sulfuric acid and phosphoric acid, characterized by the fact that the moldings are manufactured from the oxides, using inorganic and/or organic binders, the moldings are dried and/or hardened, the moldings obtained are treated with a mixture of sulfuric acid and phosphoric acid, and then the saturated moldings are subjected to a temperature treatment between 100° C. and 600° C.

Another aspect of the invention resides broadly in a process for the manufacture of a catalyst for the reduction of nitrogen oxides from waste gases or for chemical air cleaning processes, in which catalyst moldings are manufactured from iron oxide or from mixtures of iron oxide and chromium oxide and/or manganese oxide, possibly with the addition of measured quantities of activating additives, using sulfuric acid and phosphoric acid, characterized by the fact that the moldings are manufactured from the oxides, using inorganic and/or organic binders, the moldings are dried and/or hardened, the moldings obtained are treated either first with sulfuric acid and then with phosphoric acid, or first with phosphoric acid and then with sulfuric acid, and then the saturated moldings are subjected to a temperature treatment between 100° C. and 600° C.

Yet another aspect of the invention resides broadly in a process characterized by the fact that the sulfuric acid is replaced either in whole or in part by a water soluble or acid soluble sulfate and/or hydrogen sulfate of ammonium, iron, vanadium, nickel, molybdenum, aluminum, manganese, copper, cobalt, chromium, and/or that the phosphoric acid is replaced either in whole or in part by a water soluble or acid soluble phosphate and/or hydrogen phosphate of ammonium, iron, nickel, molybdenum, aluminum, manganese, copper, cobalt or chromium.

A further aspect of the invention resides broadly in a process characterized by the fact that the acids or salts are used in quantities such that the ratio of $SO_4^{-2}$ to $PO_4^{-3}$ or $HSO_4^-$ to $HPO_4^{-2}$ or $HSO_4^-$ lies in the range of 100:1 to 1:100.

A yet further aspect of the invention resides broadly in a process characterized by the fact that the ratio lies in the range of 10:1 to 1:10.

Yet another further aspect of the invention resides broadly in a process characterized by the fact that the temperature treatment is performed first at 100° C. to 250° C. as a drying treatment, and after drying, at 250° C. to 600° C. as a tempering treatment.

An additional aspect of the invention resides broadly in a process characterized by the fact that the tempering treatment is conducted at a maximum temperature between 350° C. and 450° C.

A yet additional aspect of the invention resides broadly in a process characterized by the fact that the heating rate during the tempering treatment is maintained between 5° C./h and 200° C./h.

A further additional aspect of the invention resides broadly in a process characterized by the fact that the inorganic binder used is alumina, kaolin, aluminaceous compounds such as aluminum hydroxide or aluminum hydroxychloride, or compounds containing magnesium or calcium, such as cements, possibly with particulate $SiO_2$.

A yet further additional aspect of the invention resides broadly in a process characterized by the fact that olivine, talcum, metal hydroxide or carbonate or hydrogen carbonate of Mg, Al, Fe, Ca and possibly particulate $SiO_2$ are used as additives to increase the binder effect.

Another further additional aspect of the invention resides broadly in a process characterized by the fact that the oxides of Fe, Cr and/or Mn with a grain size smaller than 0.2 mm and preferably smaller than 0.09 mm are homogeneously mixed with the activating additives used, as well as any solid binders, before the mixing with the other components of the mixture.

A yet another additional aspect of the invention resides broadly in a process characterized by the fact that the moldings, after their manufacture and drying and/or hardening before the acid treatment are soaked with a solution of aluminum hydroxide chloride and then re-dried.

Another yet further aspect of the invention resides broadly in a process characterized by the fact that the tempering treatment is conducted in an atmosphere with a reduced $O_2$-content, in particular with 0.5-10 vol.-% $O_2$.

A still further aspect of the invention resides broadly in a process characterized by the fact that the tempering treatment is performed with a concentration of 2-4 vol.-% $O_2$ in the tempering atmosphere.

A still further additional aspect of the invention resides broadly in a process characterized by the fact that organic binders are used instead of or together with the inorganic binders.

Another still further additional aspect of the invention resides broadly in a process characterized by the fact that powder resins, melting adhesives, sinter powder, furan resins, modified furfuryl alcohol resins or phenol formaldehyde resins or combinations of those compounds are used as organic binders.

Yet another still further additional aspect of the invention resides broadly in a catalyst for the reduction of nitrogen oxides in exhaust gases or for chemical air cleaning processes, manufactured according to the process mentioned above.

The invention as described hereinabove in the context of a preferred embodiment is not to be taken as limited to all of the provided details thereof, since modifications and variations thereof may be made without departing from the spirit and scope of the invention.

What is claimed is:

1. A process for the manufacture of catalytic elements, said process comprising the steps of:
   (a) providing a primary catalytic material, said primary catalytic material being a member selected from the group consisting essentially of iron oxide, a mixture of iron oxide and chromium oxide, a mixture of iron oxide and manganese oxide, and a mixture of iron oxide, chromium oxide and manganese oxide and combinations of members of the group;
   (b) mixing a binder means with said primary catalytic material for binding said primary catalytic material;
   (c) molding said mixed primary catalytic material and binder means produced in said step (b) to produce green catalytic elements;
   (d) subjecting said green catalytic elements to a first temperature treatment of 100° C. to 250° C. to set said binder means:
   (e) treating said catalytic elements obtained from said step (d) with a mixture of sulfuric acid and phosphoric acid; and
   (f) subjecting said catalytic elements obtained from said step (e) to a second temperature treatment in the range between about 100° C. and about 600° C. to temper said catalytic elements.

2. A process for the manufacture of catalytic elements according to claim 1, wherein at least a portion of said sulfuric acid is replaced by a member selected from the group consisting essentially of a water soluble sulfate, an acid soluble sulfate, ammonium hydrogen sulfate, iron hydrogen sulfate, vanadium hydrogen sulfate, nickel hydrogen sulfate, molybdenum hydrogen sulfate, aluminum hydrogen sulfate, manganese hydrogen sulfate, copper hydrogen sulfate, cobalt hydrogen sulfate, chromium hydrogen sulfate and combinations of members of the group.

3. A process for the manufacture of catalytic elements according to claim 1, wherein at least a portion of said phosphoric acid is replaced by a member selected from the group consisting essentially of a water soluble phosphate, an acid soluble phosphate, ammonium hydrogen phosphate, iron hydrogen phosphate, vanadium hydrogen phosphate, nickel hydrogen phosphate, molybdenum hydrogen phosphate, aluminum hydrogen phosphate, manganese hydrogen phosphate, copper hydrogen phosphate, cobalt hydrogen phosphate, chromium hydrogen phosphate and combinations of members of the group.

4. A process for the manufacture of catalytic elements according to claim 2, wherein at least a portion of said phosphoric acid is replaced by a member selected from the group consisting essentially of a water soluble phosphate, an acid soluble phosphate, ammonium hydrogen phosphate, iron hydrogen phosphate, vanadium hydrogen phosphate, nickel hydrogen phosphate, molybdenum hydrogen phosphate, aluminum hydrogen phosphate, manganese hydrogen phosphate, copper hydrogen phosphate, cobalt hydrogen phosphate, chromium hydrogen phosphate and combinations of members of the group.

5. A process for the manufacture of catalytic elements according to claim 1, wherein said mixture comprising sulfuric acid and phosphoric acid with which said catalytic elements are treated in said step (e) has at least one ratio of:

$SO_4^{-2}$ to $PO_4^{-3}$;
$HSO_4^-$ to $HPO_4^{-2}$; and
$HSO_4^-$ to $H_2PO_4^-$;

which lies within the range of from 100:1 to 1:100.

6. A process for the manufacture of catalytic elements according to claim 5, wherein said at least one ratio is within the range of from 10:1 to 1:10.

7. A process for the manufacture of catalytic elements according to claim 4, wherein said mixture comprising sulfuric acid and phosphoric acid with which said catalytic elements are treated in said step (e) has at least one ratio of:

$SO_4^{-2}$ to $PO_4^{-3}$;
$HSO_4^-$ to $HPO_4^{-2}$; and
$HSO_4^-$ to $H_2PO_4^-$;

which lies within the range of from 100:1 to 1:100.

8. A process for the manufacture of catalytic elements according to claim 7, wherein said at least one ratio is within the range of from 10:1 to 1:10.

9. A process for the manufacture of catalytic elements according to claim 1, wherein said first temperature treatment in said step (d) is carried out in a first temperature range of from about 100° C. to about 250° C., and wherein said second temperature treatment of said step (f) is carried out in a second temperature range of from about 250° C. to about 600° C.

10. A process for the manufacture of catalytic elements according to claim 9, wherein said second temperature treatment is carried out so as to have a maximum temperature of between about 350° C. and about 450° C.

11. A process for the manufacture of catalytic elements according to claim 10, wherein, during said second temperature treatment, the temperature to which said catalytic elements are subjected is elevated at a rate of between about 5° C./h and about 200° C./h.

12. A process for the manufacture of catalytic elements according to claim 1, wherein said binder means comprises an inorganic binder, said inorganic binder being a member selected from the group consisting essentially of alumina, kaolin, an aluminaceous compound, a magnesium compound, a calcium compound, a cement, particulate $SiO_2$ and combinations of members of the group.

13. A process for the manufacture of catalytic elements according to claim 12, additionally comprising the further step of adding to said primary catalytic material an additive to increase the binding effect of said binder means, said additive being a member selected from the group consisting essentially of olivine, talcum, particulate $SiO_2$, magnesium hydroxide, aluminum hydroxide, iron hydroxide, calcium hydroxide, magnesium carbonate, aluminum carbonate, iron carbonate, calcium carbonate, magnesium hydrogen carbonate, aluminum hydrogen carbonate, iron hydrogen carbonate, calcium hydrogen carbonate and combinations of members of the group.

14. A process for the manufacture of catalytic elements according to claim 1, wherein said iron oxide, chromium oxide and manganese oxide have grain sizes smaller than about 0.2 mm and further comprising the step of mixing an activating additive with at least one of said primary catalytic material provided in said step (a) and said mixture of said primary catalytic material and said binder means produced in said step (b), said activating additive being a member selected from the group consisting essentially of an element, an oxide and a salt, said element being a member selected from the group consisting essentially of vanadium, copper, cobalt, uranium, tungsten, nickel, molybdenum, manganese, tin, zinc, beryllium, boron, yttrium, niobium, antimony, zirconium, bismuth, silver and rare earth elements, said oxide being an oxide of a member selected from the group consisting essentially of vanadium, copper, cobalt, uranium, tungsten, nickel, molybdenum, manganese, tin, zinc, beryllium, boron, yttrium, niobium, antimony, zirconium, bismuth, silver and rare earth elements, and said salt being a salt of a member selected from the group consisting essentially of vanadium, copper, cobalt, uranium, tungsten, nickel, molybdenum, manganese, tin, zinc, beryllium, boron, yttrium, niobium, antimony, zirconium, bismuth, silver and rare earth elements.

15. A process for the manufacture of catalytic elements according to claim 14, wherein said iron oxide, chromium oxide and manganese oxide have grain sizes smaller than about 0.09 mm.

16. A process for the manufacture of catalytic elements according to claim 1, further comprising the step of following said first temperature treatment and prior to said second temperature treatment, soaking said catalytic elements with a solution comprising aluminum hydroxide chloride.

17. A process for the manufacture of catalytic elements according to claim 1, wherein said second temperature treatment of said step (f) to temper said catalytic elements is conducted in a reduced $O_2$ content atmosphere of about 0.05 to about 10 vol.-% $O_2$.

18. A process for the manufacture of catalytic elements according to claim 17, wherein said reduced $O_2$-content atmosphere is of about 2 to about 4 vol.-% $O_2$.

19. A process for the manufacture of catalytic elements according to claim 1, wherein said binder means of said step (b) is a member selected from the group consisting essentially of organic binders, inorganic binders and combinations of members of the group.

20. A process for the manufacture of catalytic elements according to claim 19, wherein said organic binders comprise a member selected from the group consisting essentially of powder resins, furan resins, modified furfuryl alcohol resins, phenol formaldehyde resins and combinations of members of the group.

21. A process for the manufacture of catalytic elements according to claim 1, wherein said treatment of said catalytic elements with sulfuric acid and phosphoric acid of said step (e) comprises a simultaneous treatment of said catalytic elements with a mixture of said sulfuric acid and said phosphoric acid.

22. A process for the manufacture of catalytic elements according to claim 1, wherein said treatment of said catalytic elements with said sulfuric acid and said phosphoric acid of said step (e) comprises an initial treatment of said catalytic elements with said sulfuric acid followed by a subsequent treatment with said phosphoric acid.

23. A process for the manufacture of catalytic elements according to claim 1, wherein said treatment of said catalytic elements with said sulfuric acid and said phosphoric acid of said step (e) comprises an initial treatment of said catalytic elements with said phosphoric acid followed by a subsequent treatment with said sulfuric acid.

24. A catalyst for the reduction of nitrogen oxides manufactured according to the process of claim 1.

* * * * *

UNITED STATES PATENT AND TRADEMARK OFFICE
CERTIFICATE OF CORRECTION

PATENT NO. : 4,895,821
DATED : January 23, 1990
INVENTOR(S) : Hartmut KAINER, et al.

It is certified that error appears in the above–identified patent and that said Letters Patent is hereby corrected as shown below: On the title page:

In the "Inventors" section, delete "Schenelle", and insert --Schnelle--.
In column 4, line 48, delete "tie", and insert --time--.
In column 10, line 41, before "lies" insert --to $H_2PO_4^-$--.

Signed and Sealed this

Fifteenth Day of January, 1991

Attest:

HARRY F. MANBECK, JR.

*Attesting Officer*          *Commissioner of Patents and Trademarks*